(12) United States Patent
Yamazaki et al.

(10) Patent No.: US 9,988,041 B2
(45) Date of Patent: Jun. 5, 2018

(54) SYSTEM AND METHOD FOR CONTROLLING A VEHICLE POWERTRAIN

(71) Applicant: FORD GLOBAL TECHNOLOGIES, LLC, Dearborn, MI (US)

(72) Inventors: Mark Steven Yamazaki, Canton, MI (US); Scott James Thompson, Canton, MI (US); Joshua Nicholas Dewalt, Canton, MI (US); Rajit Johri, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 15/180,346

(22) Filed: Jun. 13, 2016

(65) Prior Publication Data

US 2017/0355361 A1     Dec. 14, 2017

(51) Int. Cl.
*B60K 6/26* (2007.10)
*B60K 6/28* (2007.10)
*B60W 30/18* (2012.01)
*B60W 10/08* (2006.01)
*B60W 20/15* (2016.01)
(Continued)

(52) U.S. Cl.
CPC ............... *B60W 20/15* (2016.01); *B60K 6/26* (2013.01); *B60K 6/28* (2013.01); *B60K 6/365* (2013.01); *B60K 6/46* (2013.01); *B60K 6/547* (2013.01); *B60W 10/06* (2013.01); *B60W 10/08* (2013.01); *B60W 30/18009* (2013.01); *B60W 2540/10* (2013.01); *B60W 2540/12* (2013.01); *B60W 2710/0672* (2013.01); *B60W 2710/085* (2013.01); *B60Y 2200/92* (2013.01); *B60Y 2300/18008* (2013.01); *B60Y 2300/43* (2013.01); *B60Y 2300/60* (2013.01); *B60Y 2400/112* (2013.01); *B60Y 2400/60* (2013.01); *B60Y 2400/80* (2013.01); *Y10S 903/906* (2013.01); *Y10S 903/907* (2013.01); *Y10S 903/91* (2013.01); *Y10S 903/919* (2013.01); *Y10S 903/93* (2013.01)

(58) Field of Classification Search
CPC ........... B60W 20/15; B60W 30/18009; B60W 10/08; B60W 10/06; B60W 2540/12; B60W 2540/10; B60W 2710/085; B60W 2710/0672; B60K 6/28; B60K 6/547; B60K 6/365; B60K 6/26; B60K 6/46; Y10S 903/93; Y10S 903/907; Y10S 903/919; Y10S 903/31; Y10S 903/906; B60Y 2300/43; B60Y 2200/92; B60Y 2300/60; B60Y 2400/112; B60Y 2400/80; B60Y 2400/60; B60Y 2300/18008
USPC ...................................................... 701/1, 22
See application file for complete search history.

(56) References Cited

U.S. PATENT DOCUMENTS 8,965,616 B2    2/2015   Gibson et al.
8,968,151 B2    3/2015   Dai et al.
(Continued)

*Primary Examiner* — Jaime Figueroa
(74) *Attorney, Agent, or Firm* — David B. Kelley; Brooks Kushman P.C.

(57) ABSTRACT

A system and method for controlling a vehicle powertrain including an engine and a motor operable to propel the vehicle includes reducing a torque of the motor at a first torque reduction rate from a torque level above a minimum motor torque in response to a deceleration request. A torque of the engine is reduced at a second torque reduction rate less than the first torque reduction rate in response to the deceleration request.

20 Claims, 4 Drawing Sheets

(51) Int. Cl.
    *B60K 6/365*     (2007.10)
    *B60K 6/46*     (2007.10)
    *B60K 6/547*     (2007.10)
    *B60W 10/06*     (2006.01)

(56) References Cited

U.S. PATENT DOCUMENTS

| | | | | |
|---|---|---|---|---|
| 2006/0142117 A1* | 6/2006 | Colvin | B60K 6/365 | 477/107 |
| 2010/0114424 A1* | 5/2010 | Morris | B60W 30/20 | 701/51 |
| 2013/0297111 A1* | 11/2013 | Yamazaki | B60W 20/00 | 701/22 |
| 2014/0364273 A1* | 12/2014 | Martin | B60W 10/06 | 477/3 |
| 2015/0051773 A1* | 2/2015 | Hayashi | B60W 10/12 | 701/22 |
| 2015/0251649 A1* | 9/2015 | Liang | B60L 15/20 | 701/22 |
| 2015/0360690 A1* | 12/2015 | Nefcy | B60W 10/06 | 477/3 |
| 2016/0059846 A1* | 3/2016 | Wang | B60W 20/40 | 477/5 |
| 2016/0152227 A1* | 6/2016 | Tabata | B60K 6/442 | 701/22 |

\* cited by examiner

SYSTEM AND METHOD FOR CONTROLLING A VEHICLE POWERTRAIN

TECHNICAL FIELD

The present disclosure relates to a system and method for controlling a vehicle powertrain.

BACKGROUND

When a driver removes their foot from the accelerator pedal—often referred to as a "tip-out"—it is desirable to provide a smooth deceleration which is consistent from one tip-out to another. To ensure smoothness and consistency, the engine and motor in a hybrid electric vehicle must work together to deliver a requested torque profile to the input of the transmission. In some hybrid vehicle designs, the engine and motor are on the same physical shaft, yet the torque delivery characteristics are not identical. Moreover, it is not uncommon to find controlling algorithms for the engine and motor operating in different microcontrollers connected by a communication bus, or in some cases running in separate software within the same microcontroller.

The physical differences in delivery, coupled with delays resulting from the software structure, can produce both magnitude and phase errors in the delivery of the combined torque. The end result is that the torque delivered to the transmission input can be quite different from that which is expected. For example, there may be significant peaks or dips, or oscillations because of the combined delivery errors, producing variations in the tip-out response. Therefore, a need exists for a system and method for controlling a vehicle powertrain that addresses these issues.

SUMMARY

At least some embodiments include a method for controlling a vehicle powertrain including an engine and a motor operable to propel the vehicle. The method includes reducing a torque of the motor at a first torque reduction rate from a torque level above a minimum motor torque in response to a deceleration request, and reducing a torque of the engine at a second torque reduction rate less than the first torque reduction rate in response to the deceleration request.

At least some embodiments include a method for controlling a vehicle powertrain including an engine and a motor operable to propel the vehicle. The method includes reducing engine torque at a first engine torque reduction rate in response to a deceleration request when motor torque is above a minimum. The engine torque is reduced at a second engine torque reduction rate greater than the first engine torque reduction rate in response to the deceleration request when the motor torque is at the minimum.

At least some embodiments include a system for controlling a vehicle powertrain including an engine and a motor operable to propel the vehicle. The system includes a control system, including at least one controller, configured to reduce engine torque at a first engine torque reduction rate in response to a deceleration request, and reduce motor torque from above a minimum motor torque at a torque reduction rate greater than the first engine torque reduction rate in response to the deceleration request.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
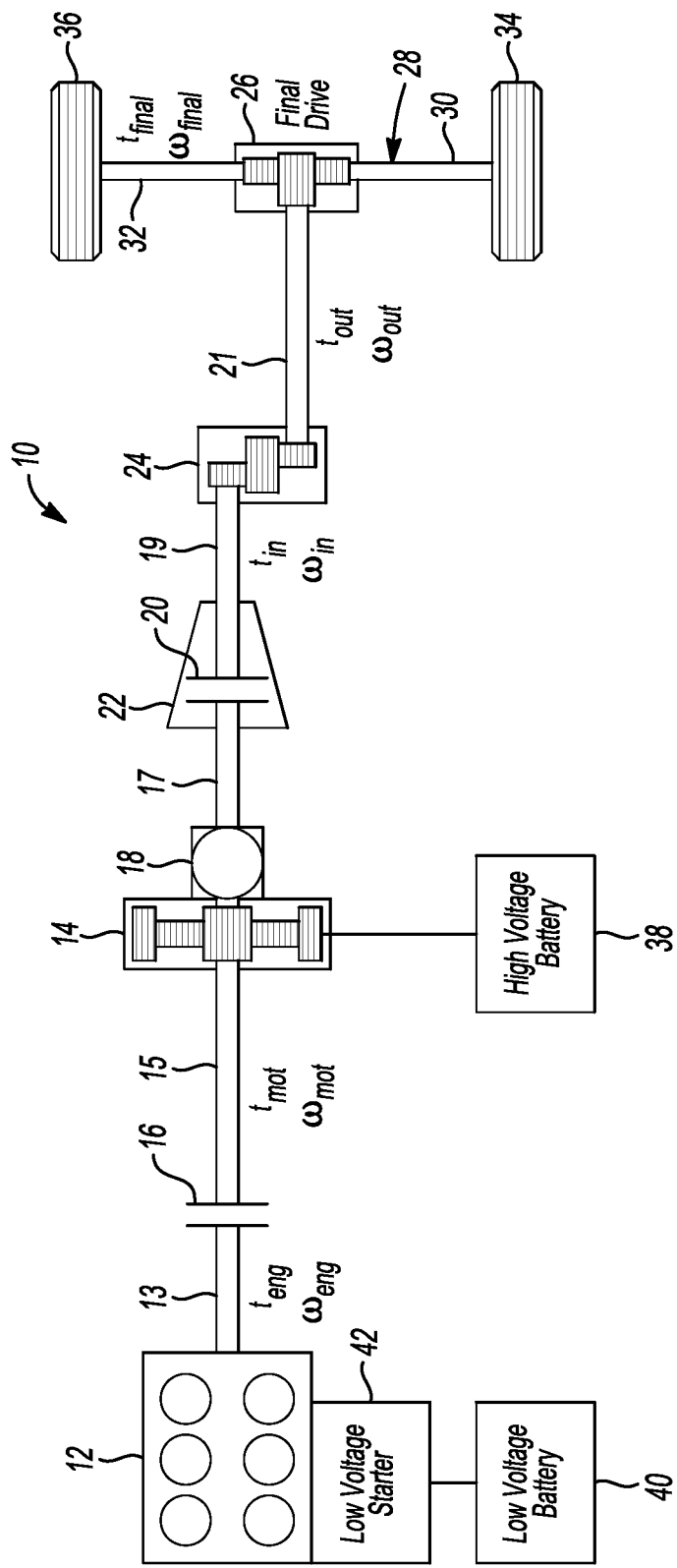
FIG. 1 shows a schematic representation of a portion of a hybrid electric vehicle having a control system capable of implementing a method in accordance with embodiments described herein.

FIG. 1 shows a portion of a vehicle 10, which, as explained in more detail below, includes a control system capable of implementing a method in accordance with embodiments described herein. The vehicle 10 includes an engine 12 and an electric machine 14, which can operate as a motor to output torque and as a generator to receive torque and output electrical energy. Disposed between the engine 12 and the motor 14 is a disconnect clutch 16. A transmission pump 18, which in this embodiment is a mechanical pump, is connected to and powered by the motor 14. The pump 18, which may be the only transmission pump, or which may work in conjunction with an auxiliary pump, provides hydraulic output to operate the disconnect clutch 16 as well as a torque-converter bypass clutch 20, which works in conjunction with a torque converter 22. It should be noted that embodiments of the present invention are not limited to the vehicle architecture described in FIG. 1: as one example, the torque converter 22 and bypass clutch 20 may be replaced with a launch clutch or other system that allows torque to be transferred through the driveline.

The vehicle 10 also includes a transmission gearbox 24, which receives the output from the torque converter 22. The bypass clutch 20, torque converter 22 and transmission gearbox 24 may comprise a step-ratio transmission, which is distinguished from a continuous variable transmission (CVT). The transmission gearbox 24 provides an output to final drive gearing 26, which may be a differential, and provides torque to or receives torque from a driven axle 28—or more particularly half-axles 30, 32—and vehicle drive wheels 34, 36. As used herein, the term "powertrain" refers to the primary components of a vehicle that generate power and deliver it to the road surface. With regard to the vehicle 10, these may include, for example, the engine 12, the motor 14, the transmission 24, the final drive gearing 26, the drive wheels 34, 36, and various shafts as described below.

Part of the vehicle electrical system includes a high-voltage battery 38, which may be used, for example, to provide electrical power to the motor 14. On the low-voltage side, a low-voltage battery 40 is connected to a low-voltage starter 42, which can be used to start the engine 12. It is understood that the high-voltage battery 38 and the low-voltage battery 40 are part of a larger electrical system, and may provide power to various electrical loads in the vehicle 10.

In FIG. 1, the outputs and the inputs of the various vehicle systems are also illustrated. For example, the engine 12 outputs both a torque ($t_{eng}$) and a speed ($\omega_{eng}$) to an engine output shaft, or crankshaft 13, and on the other side of the disconnect clutch 16 an input torque ($t_{mot}$) and input speed ($\omega_{mot}$) provide inputs into the motor 14 through the shaft 15. Alternatively, the motor torque and speed may represent outputs rather than inputs, and in such a case, the motor 14 can provide an input torque to the engine 12, for example, as an alternative to the low-voltage starter 42. When the motor 14 is being operated as a generator, it can provide electrical power to charge the high-voltage battery 38.

The transmission gearbox 24 receives both a torque ($t_{in}$) and speed ($\omega_{in}$) input, which may be a function of the output of the engine 12, the position of the disconnect clutch 16, the output of the motor 14, and the operation of the bypass clutch 20 and torque converter 22. The transmission gearbox 24 receives the torque and speed input through a shaft 17 on an output side of the motor 14 and an input side of the torque converter 22, and a shaft 19 on the output side of the torque converter 22. The output from the transmission gearbox 24 ($t_{out}$) and ($\omega_{out}$) is through a shaft 21, and is received by the differential gearing 26 and transmitted to the drive wheels 34, 36 through the axle 28, and represents the final torque ($t_{final}$) and speed ($\omega_{final}$) output. Alternatively, during regenerative braking, the drive wheels 34, 36 supply torque through the gearing and back to the motor 14. The crankshaft 13 and the other input and output shafts 15, 17, 19, 21, 30, 32 may, along with the other power producing or transmitting components described above, be considered a part of the powertrain of the vehicle 10.

Figure 2:
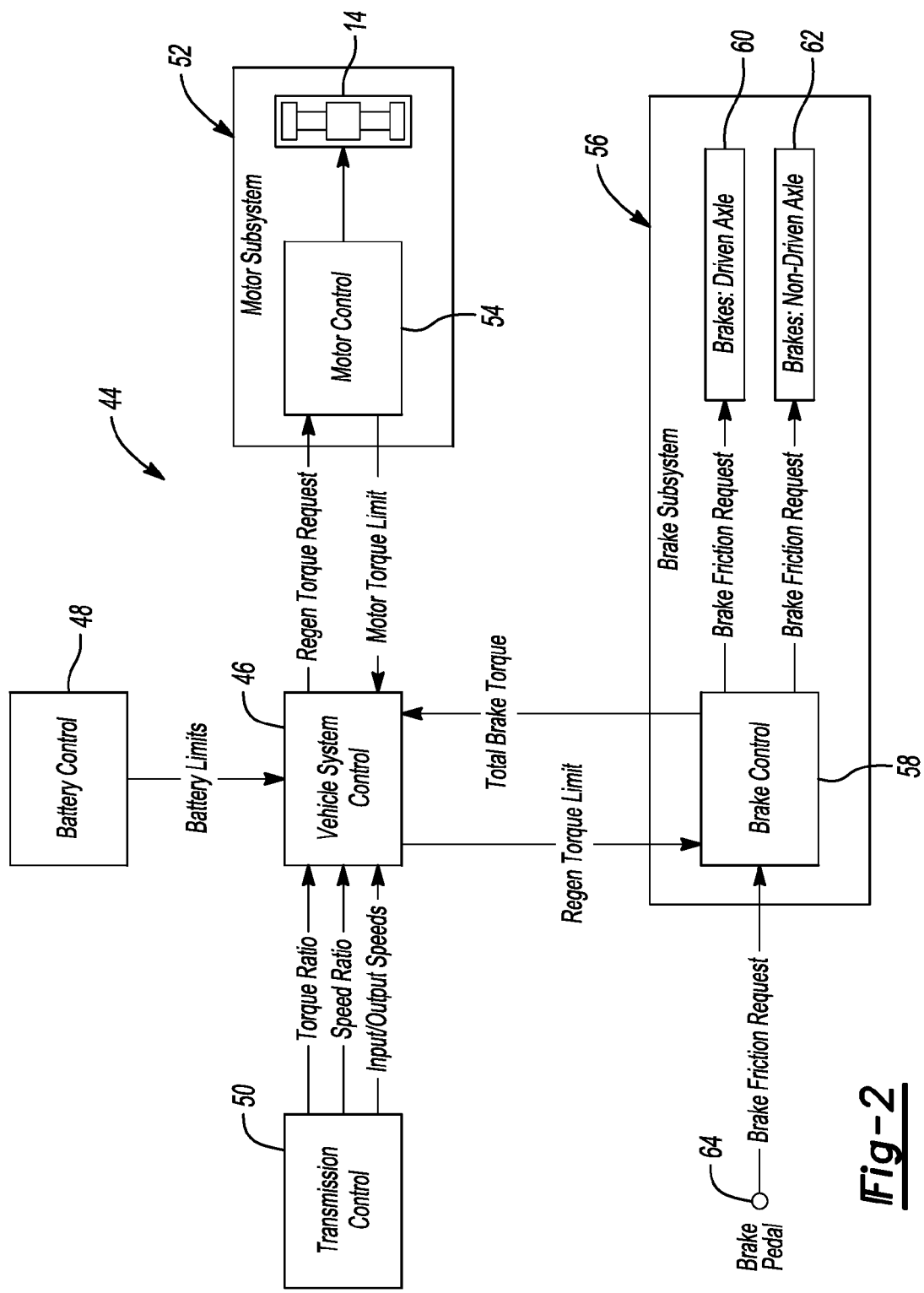
FIG. 2 shows a schematic representation of a control system architecture in accordance with embodiments described herein.

FIG. 2 shows a schematic representation of a control system 44 in accordance with embodiments described herein. Shown in FIG. 2 is a vehicle system control 46, which may include a single vehicle system controller (VSC), or any number of individual hardware and software controllers connected to each other. In the embodiment illustrated in FIG. 2, the vehicle system control 46 sends and receives various signals to other controllers in the control system 44. This communication may occur, for example, over a controller area network (CAN). A battery control 48 provides as an input into the vehicle system control 46 certain battery limits, which may be useful for controlling the charging and discharging of the batteries 38, 40. A transmission control 50 provides torque and speed ratios, as well as input and output speeds to the vehicle system control 46.

Also shown in FIG. 2 is a motor subsystem 52, which includes the motor 14 and a motor control 54. Among other things, the motor controller 54 receives a regenerative torque request from the vehicle system controller 46, and provides motor torque limits back to the vehicle system controller 46. A brake subsystem 56 includes a brake control 58, which communicates with brakes 60 on the driven axle—see the axle 28 in FIG. 1—and also communicates with brakes 62 on the non-driven axle. Communicating with the vehicle system controller 46, the brake controller 58 outputs total brake torque and receives regenerative torque limits. Finally, a brake pedal 64 is shown providing a brake request to the brake controller 58. Although certain inputs and outputs are illustrated in the schematic diagram shown in FIG. 2, it is understood that other signals and information can be communicated between some or all of the controllers illustrated in the control system 44. In addition, some vehicles may include a different configuration of controllers while still providing the system management for implementing methods in accordance with embodiments described herein.

As described above, embodiments may include a system and method for controlling a powertrain of a vehicle, such as the vehicle 10 illustrated in FIG. 1. More particularly, embodiments may provide a mechanism for reducing or eliminating various driveline disturbances resulting from a reduction in driver demanded torque, such as may occur during a fast tip-out. With reference to the vehicle 10 shown in FIG. 1, and the control system 44 shown in FIG. 2, various examples are now described.

Figure 3:
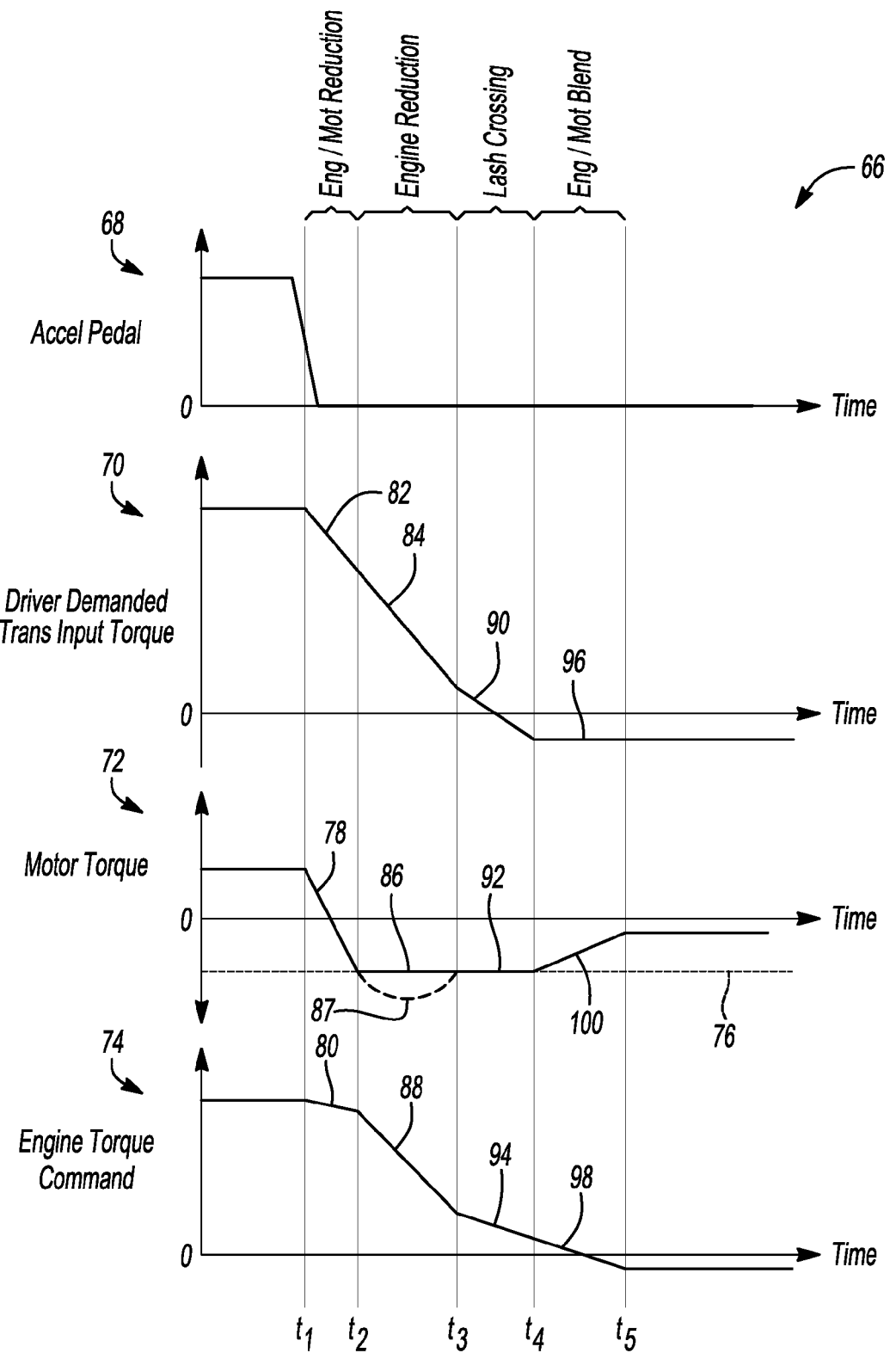
FIG. 3 shows a graph illustrating various powertrain parameters changing over time pursuant to implementation of a system and method in accordance with embodiments described herein.

FIG. 3 shows a graph 66 illustrating a number of vehicle parameters measured or estimated over time. Uppermost is a curve 68 showing accelerator pedal position; next is a curve 70 showing a driver demanded torque, which may be considered the input torque to a transmission. The next two curves 72, 74 show the motor torque and engine torque, respectively. Prior to time ($t_1$), the accelerator pedal is engaged, which results in a positive driver demanded torque as shown in the curve 70. In the embodiment shown in FIG. 3, the driver demanded torque has two components: motor torque and engine torque. As shown in the curve 72, the dashed line 76 represents a minimum amount of torque at which the motor can operate, and it is a negative torque as indicated by its position relative to the "zero" line. Therefore, prior to ($t_1$), the motor torque is outputting a level of torque that is greater than the minimum motor torque.

At the time ($t_1$), the driver demanded torque begins to decrease—e.g., there has been a deceleration request. This may be caused, for example, by a tip-out, wherein the vehicle operator removes their foot from the accelerator pedal. This is shown in the curve 68, where the accelerator input begins to drop slightly before time ($t_1$), and then swiftly drops to zero shortly after time ($t_1$). Starting at time ($t_1$), the motor torque is reduced steeply at a first torque reduction rate indicated by the line segment 78 on the curve 72. In contrast, the engine torque is reduced at a second torque reduction rate, or a first engine torque reduction rate, as indicated by the line segment 80 on the curve 74. As shown in FIG. 3, the first engine torque reduction rate is less than the motor torque reduction rate. As shown at the top of the graph 66, the period between times ($t_1$) and ($t_2$) is characterized by both engine and motor torque reduction. Although the overall rate of driver demanded torque reduction may be different for different vehicles, different powertrains, and may even vary within the same vehicle from event to event, one example of an overall driver demanded torque reduction rate may be in the range of 1000-1200 Newton meters per second (Nm/s) when a driver tips-out.

In the embodiment shown in FIG. 3, during the period between ($t_1$) and ($t_2$) the motor torque reduction rate—see the line segment 78—is greater than the overall driver demanded torque reduction rate indicated by the line segment 82 on the curve 70. In contrast, the first engine torque reduction rate—see the line segment 80—is less than the driver demanded torque reduction rate. Overall, however, the sum of the motor torque and the engine torque is equal to the driver demanded torque, and therefore, the sum of the motor and engine torque reduction rates matches the overall driver demanded torque reduction rate. Implementing a torque reduction strategy using different values for the torque reduction rate of the motor and the engine, such as shown with the curves 72, 74, helps to reduce or eliminate the phase delay and driveline disturbance that might otherwise be present if the two torque producers were operated to reduce torque at or very near the same rate.

At time ($t_2$), the driver demanded torque is still consistently being reduced as indicated by the line segment 84 on the curve 70; however, as shown by the curve 72, the motor torque has reached the minimum motor torque, indicated by the line segment 86, which is coincident with the line 76. The minimum motor torque may be, for example, a function of mechanical-electrical characteristics of the motor and the state of charge of the battery, although other factors may affect this value as well. It may be desired to operate the motor such that the motor torque would follow the dashed line curve 87; however, this is below the minimum motor torque and outside the motor's area of operation. Because the motor torque has hit its minimum value at time ($t_2$), it remains constant throughout the time period ($t_2$) to ($t_3$). Therefore, during this period, the engine torque needs to be reduced at a faster rate than it previously was in order to maintain the desired rate of reduction in the driver demanded torque. Specifically, the engine torque is reduced at a third torque reduction rate, or a second engine torque reduction rate, which is greater than the first engine torque reduction rate. This is indicated by the segment 88 of the curve 74. During the time period between ($t_2$) and ($t_3$), the second engine torque reduction rate equals the torque reduction rate of the driver demanded torque because the motor torque is not being reduced at all. The top of the graph 66 shows that the period between ($t_2$) and ($t_3$) is characterized by engine torque reduction only.

The time period between ($t_3$) and ($t_4$) is characterized by a lash crossing—i.e., the period in which gear teeth or other interacting components of a driveline in the powertrain may be prone to contact. Lash may occur, for example, because of a change in the direction of torque. Various methods for detecting when the powertrain is about to encounter a lash crossing are known in the art. In the embodiment described herein, one way may be to set a calibratable torque value—e.g., 30 Nm—such that when the driver demanded torque gets very near or at this level, the control for reducing torque during the lash crossing will be implemented.

As shown by the segment 90 on the curve 70, it is during the lash crossing that the driver demanded torque changes from a positive value to a negative value. Because it is desirable to traverse the lash zone smoothly, a control system, such as the control system 44, may be programmed to reduce the torque reduction rate for the driver demanded torque through the lash crossing. As shown by the segment 92 of the curve 72, the motor torque remains constant at its minimum value through this zone. Because of this, it is necessary to further reduce the torque reduction rate for the engine to a fourth torque reduction rate so as to match the change in the driver demanded torque reduction rate. In other words, during the lash crossing, the torque of the engine is reduced at a third engine torque reduction rate that is less than the second engine torque reduction rate; this is indicated by the segment 94 on the curve 74.

During the time period between ($t_4$) and ($t_5$), the driver demanded torque has reached a minimum and is no longer being reduced; this is indicated by the line segment 96 on the curve 70. During this same time period, however, the engine torque command is still being reduced—in the embodiment shown in FIG. 3, it is still being reduced at the third engine torque reduction rate—as indicated by the line segment 98 on the curve 74. Therefore, in order to keep the overall driver demanded torque constant, it is necessary to raise the motor torque from its minimum during this time period. This is indicated by the line segment 100 on the curve 72. Because the sum of the motor torque and engine torque needs to equal the overall driver demanded torque, the motor torque is controlled so that the rate of motor torque increase offsets the rate of engine torque decrease—this keeps the driver demanded torque constant.

At time ($t_5$), after the lash crossing is complete, the input torque is at its quiescent value—i.e., the powertrain is operating at steady state. During this time, driveline losses are compensated by the combination of engine and motor torque so that the sum of the engine and motor torques is equal to the transmission input torque. In the embodiment shown in FIG. 3, the driver demanded torque is constant, and therefore the torque of the motor and the torque of the engine are also both constant, and are operated at levels so that the sum of their torques is equal to the driver demanded torque.

Figure 4:
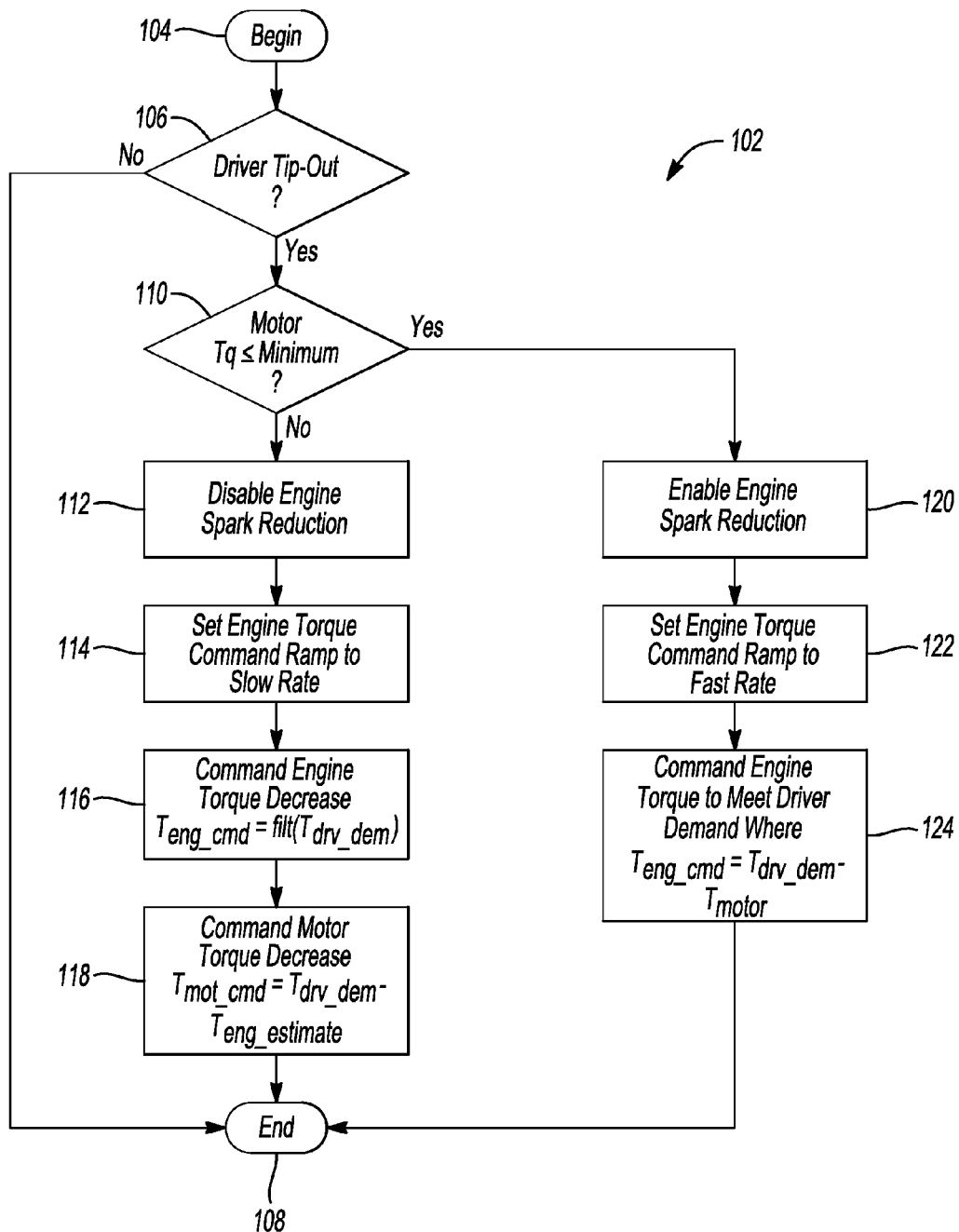
FIG. 4 shows a flowchart illustrating a method and implementation of a system in accordance with embodiments described herein.

FIG. 4 shows a flowchart 102 illustrating a method in accordance with embodiments described herein. This method may be implemented, for example, by a control system, such as the control system 44 shown in FIG. 2. The method begins at step 104, and then moves to decision block 106 where it is decided whether there has been a driver tip-out. If there has not been a tip-out, the method ends at step 108. Although a driver demanded tip-out has been used as an example of how a driver demanded torque may be reduced, a deceleration request may be received by controllers within the powertrain because of other inputs.

If it is determined at step 106 that a driver tip-out has occurred, the method moves to decision block 110 where it is determined whether the motor is operating at a torque level that is less than or equal to the minimum motor torque level. If it is not, this means that the motor is available to work in conjunction with the engine to reduce the powertrain torque in response to the deceleration request and the method will move to step 112. As described in detail above, when the motor is outputting a torque that is greater than the minimum motor torque, the general procedure in response to a deceleration request is to reduce the motor torque at a relatively fast rate while the engine torque is reduced at a slower rate. In order to keep the torque reduction rate of the engine relatively low, engine spark reduction is disabled. Next, at step 114, the engine torque command is set to ramp-out at a relatively slow rate.

At step 116, the engine is commanded with the torque command set at step 114; this is indicated by the line segment 80 of the curve 74 in FIG. 3, where the engine is operated according to a first engine torque reduction rate. As shown in the flowchart 102, step 116 may be described according to the following equation: $T_{eng\_cmd} = \text{filt}(T_{drv\_dem})$. Specifically, the engine is controlled with an engine torque command that is a filtered version of the driver demanded torque. In the example given above, where the overall driver demanded torque was being reduced on the order of 1000-1200 Nm/s, the filtered driver demanded torque, which is the torque commanded to the engine at step 116, may be reduced at approximately 250 Nm/s.

As described in detail above, when the motor torque is operating at a level above the minimum motor torque, it will be reduced in response to a deceleration request at a torque reduction rate that is greater than the first torque reduction rate set at step 114 in the flowchart 102. As also described above, the sum of the motor torque command and engine torque command is equal to the driver demanded torque; therefore, at step 118, the motor torque is commanded to decrease according to the following formula: $T_{mot\_cmd} = T_{drv\_dem} - T_{eng\_estimate}$, which uses an estimate of the engine torque to determine the motor torque command. In sum, steps 112-118 follow the procedure described in detail above with regard to FIG. 3 for the time period between ($t_1$) and ($t_2$). After step 118, the method ends at block 108.

Returning to FIG. 4, if it is determined at decision block 110 that the motor is operating at the minimum motor torque, the method moves to step 120. In general, the next three steps correspond to the time period between ($t_2$) and ($t_3$) shown in FIG. 3—i.e., one of the periods of time where the motor torque is operating at the minimum motor torque. At step 120 engine spark reduction is enabled. This reduces engine power and allows it to reduce torque at a relatively fast rate. At step 122, the engine torque is set with a command that will ramp it out at a relatively fast rate, and at step 124, the command is implemented. Specifically, at step 124, the engine torque is commanded according to the following formula: $T_{eng\_cmd} = T_{drv\_dem} - T_{motor}$. For this equation, the driver demanded torque is known based on inputs to the controller, such as accelerator pedal position, transmission gear, etc. The motor torque is also known, since it is operating at the minimum motor torque. Therefore, the engine torque command can be easily determined and the engine torque reduction will match the reduction in driver demand because the motor torque is constant. Operation of the engine during this period corresponds to the second engine torque reduction rate shown as line segment 88 on the curve 74 in FIG. 3. After step 124, the method ends at block 108. The control processes that are used as the vehicle continues to decelerate through the lash zone and into the quiescent period is described in detail above with regard to FIG. 3.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a vehicle powertrain including an engine and a motor operable to propel the vehicle, comprising:
   reducing a torque of the motor at a first torque reduction rate from a torque level above a minimum motor torque in response to a deceleration request; and
   reducing a torque of the engine at a second torque reduction rate less than the first torque reduction rate in response to the deceleration request.

2. The method of claim 1, wherein reducing the torque of the engine at the second torque reduction rate includes disabling engine spark reduction.

3. The method of claim 1, further comprising reducing the torque of the engine at a third torque reduction rate greater than the second torque reduction rate, and holding the torque of the motor constant when the motor is outputting the minimum motor torque.

4. The method of claim 3, wherein reducing the torque of the engine at the third torque reduction rate includes enabling engine spark reduction.

5. The method of claim 3, wherein the third torque reduction rate equals a torque reduction rate for a driver demanded torque.

6. The method of claim 5, further comprising reducing the torque reduction rate for the driver demanded torque when the powertrain is operating in a lash zone.

7. The method of claim 6, further comprising reducing the torque of the engine at a fourth torque reduction rate that is less than the third torque reduction rate when the powertrain is operating in the lash zone.

8. The method of claim 7, further comprising increasing the torque of the motor from the minimum motor torque such that the driver demanded torque is constant after operation of the powertrain in the lash zone is complete.

9. The method of claim 8, further comprising holding the torque of the motor and the torque of the engine constant after operation of the powertrain in the lash zone is complete and the powertrain is operating at steady state.

10. A method for controlling a vehicle powertrain including an engine and a motor operable to propel the vehicle, comprising:
    reducing engine torque at a first engine torque reduction rate in response to a deceleration request when motor torque is above a minimum; and
    reducing engine torque at a second engine torque reduction rate greater than the first engine torque reduction rate in response to the deceleration request when the motor torque is at the minimum.

11. The method of claim 10, further comprising reducing the motor torque at a torque reduction rate greater than the first engine torque reduction rate in response to the deceleration request when the motor torque is above the minimum.

12. The method of claim 10, wherein the second engine torque reduction rate equals a torque reduction rate for a driver demanded torque.

13. The method of claim 10, further comprising reducing the engine torque at a third engine torque reduction rate that is less than the second engine torque reduction rate when the powertrain is operating in a lash zone.

14. The method of claim 13, further comprising increasing the motor torque, while the engine torque is being reduced at the third engine torque reduction rate, such that a driver demanded torque is constant after the lash zone is complete.

15. The method of claim 14, further comprising holding the motor torque and the engine torque constant after the lash zone is complete and the powertrain is operating at steady state.

16. A system for controlling a vehicle powertrain including an engine and a motor operable to propel the vehicle, comprising:
    a control system, including at least one controller, configured to reduce engine torque at a first engine torque reduction rate in response to a deceleration request, and reduce motor torque from above a minimum motor torque at a torque reduction rate greater than the first engine torque reduction rate in response to the deceleration request.

17. The system of claim 16, wherein the control system is further configured to reduce engine torque at a second engine torque reduction rate greater than the first engine torque reduction rate when the motor is outputting the minimum motor torque.

18. The system of claim 17, wherein the second engine torque reduction rate equals the torque reduction rate for a driver demanded torque.

19. The system of claim 17, wherein the control system is further configured to reduce the engine torque at a third engine torque reduction rate that is less than the second engine torque reduction rate when the powertrain is operating in a lash zone.

20. The system of claim 19, wherein the control system is further configured to increase the motor torque, while the engine torque is being reduced at the third engine torque reduction rate, such that a driver demanded torque is constant after the lash zone is complete.

\* \* \* \* \*